United States Patent
Kolhouse et al.

(10) Patent No.: US 11,828,252 B2
(45) Date of Patent: *Nov. 28, 2023

(54) ENGINE INTAKE AIR SYSTEM INCLUDING CAC BYPASS AND SEPARATE BYPASS HEATER, AND HIGH-EFFICIENCY SPARK-IGNITED DIRECT INJECTION LIQUID PROPANE ENGINE ARCHITECTURES INCLUDING SAME

(71) Applicant: CUMMINS INC., Columbus, IN (US)

(72) Inventors: J. Steven Kolhouse, Columbus, IN (US); Daniel J. Mohr, Scipio, IN (US); Adrian P. Dale, Columbus, IN (US); Samuel C. Geckler, Columbus, IN (US); Leon A. LaPointe, Columbus, IN (US); David J. Stroh, Columbus, IN (US); Anthony Kyle Perfetto, Columbus, IN (US); Robin J. Bremmer, Columbus, IN (US); Ryan Edward Schultz, Columbus, IN (US)

(73) Assignee: Cummins Inc., Columbus, IN (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/370,269

(22) Filed: Jul. 8, 2021

(65) Prior Publication Data
US 2021/0332777 A1 Oct. 28, 2021

Related U.S. Application Data (63) Continuation of application No. 16/497,594, filed as application No. PCT/US2018/023609 on Mar. 21, 2018, now Pat. No. 11,060,468.
(Continued)

(51) Int. Cl.
*F02M 31/04* (2006.01)
*F02B 29/04* (2006.01)
(Continued)

(52) U.S. Cl.
CPC ....... *F02M 31/042* (2013.01); *F02B 29/0418* (2013.01); *F02D 41/0007* (2013.01);
(Continued)

(58) Field of Classification Search
CPC ............. F02B 29/0418; F02B 29/0493; F02B 37/001; F02B 37/007; F02B 43/10;
(Continued)

(56) References Cited

U.S. PATENT DOCUMENTS

| 5,385,132 A | 1/1995 | Lehman |
| 6,907,870 B2 | 6/2005 | zur Loye et al. |

(Continued)

FOREIGN PATENT DOCUMENTS

| EP | 1 650 421 | 4/2006 |

OTHER PUBLICATIONS

International Search Report and Written Opinion from corresponding PCT Application No. PCT/US2018/023609, pp. 1-9.

*Primary Examiner* — J. Todd Newton
(74) *Attorney, Agent, or Firm* — Foley & Lardner LLP (57) ABSTRACT

An intake air circuit is structured to transmit intake air from a turbocharger compressor to an intake manifold of an engine. A charge air cooler ("CAC"), a bypass line, and a bypass heater are each positioned along the intake air circuit in parallel with each other. A first control valve is structured to controllably divert the intake air around the CAC. A second control valve is structured to controllably divert the intake air around at least one of the bypass line and the bypass heater. A controller operatively coupled to each of the engine, and the first and second control valves is structured to control each of the first and second control valves to cause the intake air to flow along a determined desired flow path based on each of measured ambient temperature and measured engine load.

16 Claims, 4 Drawing Sheets

Related U.S. Application Data (60) Provisional application No. 62/479,545, filed on Mar. 31, 2017.

(51) Int. Cl.
  *F02D 41/00* (2006.01)
  *F02B 37/00* (2006.01)
  *F02M 26/08* (2016.01)
  *F02B 37/007* (2006.01)
  *F02B 43/10* (2006.01)

(52) U.S. Cl.
  CPC ......... *F02M 31/04* (2013.01); *F02B 29/0493* (2013.01); *F02B 37/001* (2013.01); *F02B 37/007* (2013.01); *F02B 43/10* (2013.01); *F02M 26/08* (2016.02)

(58) Field of Classification Search
  CPC ...... F02B 29/04; F02B 29/0475; F02B 43/00; F02M 31/042; F02M 31/04; F02M 26/08; F02M 26/06; F02D 41/0007
  USPC .......................................................... 60/599
  See application file for complete search history.

(56) References Cited

U.S. PATENT DOCUMENTS

| | | | |
|---|---|---|---|
| 7,302,918 B2 | 12/2007 | Munshi et al. | |
| 7,963,832 B2* | 6/2011 | Bellinger | F02D 41/0007 123/179.21 |
| 9,194,339 B2 | 11/2015 | Mulye | |
| 11,060,468 B2* | 7/2021 | Kolhouse | F02M 31/042 |
| 2007/0187157 A1 | 8/2007 | Hurley | |
| 2007/0197157 A1* | 8/2007 | Bellinger | F02B 29/0418 454/155 |
| 2014/0150755 A1 | 6/2014 | Cunningham et al. | |
| 2014/0180180 A1 | 6/2014 | Nilsson et al. | |
| 2014/0190160 A1 | 7/2014 | Styles et al. | |
| 2014/0251252 A1* | 9/2014 | Wasada | F02M 31/042 123/184.21 |
| 2016/0025029 A1 | 1/2016 | Kolhouse | |
| 2016/0319779 A1 | 11/2016 | Lapointe et al. | |
| 2017/0051659 A1* | 2/2017 | Banker | F02D 41/0007 |

* cited by examiner

ENGINE INTAKE AIR SYSTEM INCLUDING CAC BYPASS AND SEPARATE BYPASS HEATER, AND HIGH-EFFICIENCY SPARK-IGNITED DIRECT INJECTION LIQUID PROPANE ENGINE ARCHITECTURES INCLUDING SAME

CROSS-REFERENCE TO RELATED APPLICATIONS

This application is a continuation of U.S. patent application Ser. No. 16/497,594, filed on Sep. 25, 2019, which is the U.S. National Stage of PCT Application No. PCT/US2018/023609, filed on Mar. 21, 2018, which claims priority to and the benefit of U.S. Provisional Patent Application No. 62/479,545, filed on Mar. 31, 2017, the contents of which are incorporated by reference herein in their entity.

TECHNICAL FIELD

The present disclosure relates generally to internal combustion engine systems.

BACKGROUND

Internal combustion engines generate motive power by burning fuel with air inside of a combustion chamber to produce work. Engines can be structured to initiate combustion of the air-fuel mixture via spark ignition ("SI") or compression ignition ("CI") systems. SI engines typically operate using gasoline, while CI engines typically operate using diesel fuel.

However, some engines operate using alternative fuels, such as liquefied petroleum gas ("LPG"), natural gas, hydrogen, methane, methanol, and ethanol, among other fuels. Several factors have increased interest in alternative fuels in recent years. For example, certain alternative fuels may provide improved performance over gasoline or diesel fuel regarding generated emissions, cost, long-term sustainability, and other factors.

LPG is a low pressure liquefied gas mixture composed primarily of propane and butane, and is also referred to as "liquefied propane gas" or simply "propane." LPG has a lower carbon content than gasoline and diesel fuel, and therefore produces less carbon dioxide ($CO_2$) during combustion. LPG also has a relatively high octane value, which can also result in less $CO_2$ production when LPG is burned in an engine with a higher compression ratio or at better combustion phasing than a typical SI engine designed for a fuel such as gasoline.

Natural gas is composed primarily of methane ($CH_4$). Natural gas is stored either in gas form as compressed natural gas ("CNG") or in liquid form as liquid natural gas ("LNG"). Natural gas also has a lower carbon content and a higher octane value than gasoline and diesel fuel, and therefore also produces less $CO_2$ during combustion.

SUMMARY

One example embodiment relates to an intake air system. An example intake air system includes a turbocharger that includes a compressor. An intake air circuit is structured to transmit intake air from the compressor to an intake manifold of an engine. A charge air cooler is positioned along the intake air circuit. A bypass line is positioned along the intake air circuit in parallel with the charge air cooler. A bypass heater is positioned along the intake air circuit in parallel with each of the charge air cooler and the bypass line. A first valve is positioned along the intake air circuit upstream of the charge air cooler. The first valve is structured to controllably divert the intake air around the charge air cooler. A second valve is positioned along the intake air circuit upstream of the bypass heater. The second valve is structured to controllably divert the intake air around at least one of the bypass line and the bypass heater.

In particular implementations, the first valve is a first control valve, and the second valve is a second control valve. Additionally, a controller is operatively coupled to each of the engine, the first control valve, and the second control valve. The controller comprises an operating conditions circuit structured to receive an engine load signal indicative of an engine load on the engine, and receive an ambient temperature signal indicative of a measured ambient temperature external to the engine. The controller further comprises an intake air flow path circuit structured to determine, based on each of the engine load signal and the ambient temperature signal, a desired flow path of the intake air through at least one of the charge air cooler, the bypass line, and the bypass heater. The controller still further comprises a control valve actuation circuit structured to control each of the first and second control valves to cause the intake air to flow along the determined desired flow path.

Various other embodiments related to a method. The method comprises providing an intake air system for an engine. The air intake system comprises an intake air circuit structured to transmit intake air from the compressor to an intake manifold of an engine. The air intake system further comprises a charge air cooler positioned along the intake air circuit. The air intake system still further comprises a first bypass line positioned along the intake air circuit in parallel with the charge air cooler, and a second bypass line positioned along the intake air circuit in parallel with each of the charge air cooler and the bypass line. The second bypass line includes a bypass heater. The method further comprises selectively directing intake air flow through at least one of the charge air cooler, the first bypass line, and the second bypass line so as to maintain a temperature of the intake air flow above a dew point temperature.

Various other embodiments relate to a spark-ignited liquid propane gas engine system. An example system includes a spark-ignited internal combustion engine structured to operate using liquid propane gas as its sole fuel source. An air handling system is operatively coupled to the engine. The air handling system includes a first turbocharger, which includes a first turbine in exhaust gas receiving communication with a first exhaust manifold of the engine. The first turbocharger also includes a first compressor in intake air providing communication with an intake air circuit. A second turbocharger includes a second turbine in exhaust gas receiving communication with a second exhaust manifold of the engine, and a second compressor in intake air providing communication with the intake air circuit. A charge air condensation reduction system includes a charge air cooler, a bypass line, and a bypass heater. Each of the charge air cooler, the bypass line, and the bypass heater is positioned along the intake air circuit in parallel with the others. An intake air flow control system is structured to controllably direct intake air flow through a flow path comprising one or more of the charge air cooler, the bypass line, and the bypass heater in order to minimize condensation in the intake air circuit. The intake air circuit is structured to transmit the intake air from the charge air condensation reduction system to an intake manifold of the engine.

Various other embodiments relate to a spark-ignited liquid propane fuel engine system. An example system includes a spark-ignited internal combustion engine structured to operate using liquid propane fuel as its sole fuel source. A direct fuel injection system is in liquid propane fuel providing communication with each of a plurality of cylinders of the engine. A turbocharger includes a turbine that is in exhaust gas receiving communication with an exhaust manifold of the engine. A compressor of the turbine is in intake air providing communication with an intake manifold of the engine.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Internal combustion engines are conventionally designed to be optimized for operation with either gasoline or diesel fuel. Because gasoline and diesel engines far outnumber alternative fuel engines, alternative fuel engines typically comprise conventional gasoline or diesel engines modified to operate using alternative fuels. However, alternative fuels (e.g., propane and natural gas) typically do not have a cetane value sufficient to allow for their ignition through compression. Accordingly, CI (e.g., diesel) engines must be converted to operate as SI engines in order to use gaseous fuels. For example, such conversions may involve replacing cylinder heads, pistons, fuel injection systems, etc. Alternatively, SI (e.g., gasoline) engines may be converted to operate using gaseous fuels. However, production gasoline engines are not capable of operating at high compression ratios, such as 11.0:1 or greater, or 13.0:1 or greater, depending on the engine. As will be appreciated, in certain implementations, it is desirable to operate SI liquid propane fuel engines at these compression ratios.

Certain components of engines converted for use with gaseous fuels are over-sized or under-sized, because they were originally designed for use with different fuels. For example, natural gas engines may be "stuck" with oversized original equipment manufacturer ("OEM") charge air coolers ("CACs") that are sized for maximum cooling requirements of diesel engines. CACs are used to cool intake air in order to increase charge density, thereby increasing power output of the engine and preventing knock (pre-detonation of the air-fuel charge). Cooling intake air temperature via a CAC can also reduce fuel consumption and emissions. CACs are often used with forced induction (e.g., turbocharged or supercharged) engine systems to remove heat generated by compressing the intake air.

CACs designed for use with diesel engines operate with approximately 100% efficiency when used with natural gas engines. In other words, the temperature of air exiting the CAC is typically approximately equal to the ambient air temperature. However, condensate may form in the CAC if the intake air is cooled below the dew point of water. By operating at approximately 100% CAC efficiency, low ambient temperatures can further cool intake air and cause condensation. For example, condensation can occur frequently during cold weather periods, such as fall through late spring.

In some natural gas engine systems, turbochargers are structured to operate only above a threshold engine load level. In other words, the turbocharger compressor does not generate boost pressure until the engine load exceeds a threshold value (e.g., 600 ft-lbs of torque). Accordingly, the engine operates as a "naturally aspirated" engine below the threshold engine load value. In this case, the turbocharger compressor may not generate enough heat to avoid condensation at light-load and part-load operating conditions.

Some intake air systems include a CAC bypass heater to minimize intake condensation. However, including a heater in a CAC bypass line causes a significant air flow restriction through the bypass line. In some situations, this airflow restriction is acceptable only when the CAC bypass circuit is utilized in light engine load conditions (e.g., at idle). However, the airflow restriction is more pronounced—and in some cases unacceptable—during higher engine load operating conditions when the mass flow rate of the intake air is higher. Other intake air systems include a CAC bypass line without a heater to minimize intake condensation without causing significant flow restrictions. However, such systems may still result in intake condensation at low ambient temperatures and low engine load operating conditions.

Various embodiments relate to an engine intake air system including a charge air cooler bypass and separate bypass heater. In some embodiments, the engine intake air system is structured for use with alternative fuel (e.g., natural gas or propane) engines. The intake air system includes an intake air circuit comprising a CAC, a CAC bypass line, and a CAC bypass heater, each being positioned along the intake air circuit in parallel with each other. A controller is structured to operate first and second control valves to controllably direct intake air flow through a flow path comprising one or more of the CAC, the CAC bypass line, and the CAC bypass heater, in order to minimize or prevent condensation in the intake air system. The intake air flow path is defined based on at least engine load and ambient temperature. As will be appreciated, the intake air system is structured to prevent intake air condensation while minimizing airflow restrictions based at least in part on ambient temperature and engine load.

As will be appreciated, the intake air system, according to various embodiments, provides improved operation compared to existing intake air systems by controllably directing intake air flow through the CAC bypass heater at light load conditions (when flow restrictions are not critical), and through the low-restriction CAC bypass at partial load conditions to avoid flow losses when the intake air mass flow rate is higher. Accordingly, the present intake air system provides technical advantages over existing intake air systems by utilizing a hybrid CAC bypass structure including a CAC bypass and a separate bypass heater in order to minimize intake air flow restriction losses, while still preventing condensation of the intake air.

Various other embodiments relate to a direct injection ("DI") turbocharged SI engine structured to operate using liquid propane fuel. For example, some embodiments relate to a DI turbocharged SI engine structured to operate using liquid propane gas, as its sole fuel source. In some embodiments, the DI turbocharged SI liquid propane fuel engine is structured to operate using a compression ratio that is higher than 11.0:1. In some embodiments, the DI turbocharged SI liquid propane fuel engine is structured to operate using a compression ratio that is higher than 13.0:1. Operation at such compression ratios provides improved engine efficiency. It also allows the engine to be sized smaller than a conventional engine with the same power output. Because the engine is downsized, the engine is structured to operate at higher loads for a greater percentage of time.

In some embodiments, an operating constraint of the DI turbocharged SI liquid propane fuel engine is combustion knock due to at least in part to operation at high compression ratios. According to various embodiments, the DI turbocharged SI liquid propane fuel engine includes one or more features to minimize or prevent engine knock. For example, in some embodiments, the DI turbocharged SI liquid propane fuel engine includes one or more of (1) an exhaust gas recirculation ("EGR") system; (2) a CAC; (3) a split exhaust manifold and a turbocharger with a divided (also referred to as split-entry) turbine housing; and (4) piston cooling nozzles ("PCNs") to minimize or prevent engine knock.

Figure 1:
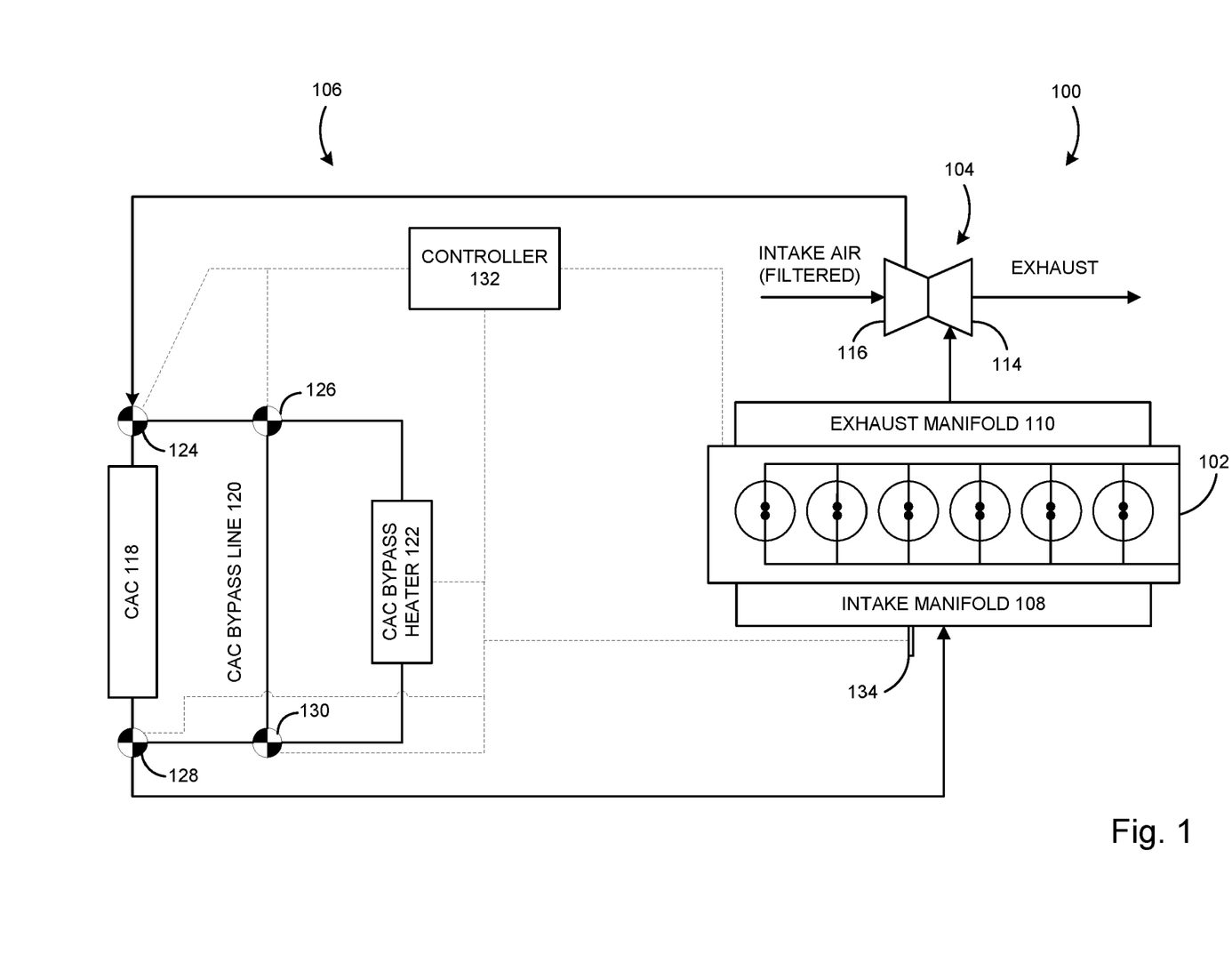
FIG. 1 is a schematic diagram of an engine system including an engine, a turbocharger, and an intake air system, according to an example embodiment.

FIG. 1 is a schematic diagram of an engine system 100 including an engine 102, a turbocharger 104, and an intake air system 106, according to an example embodiment. According to various embodiments, the engine 102 is structured to be powered using an alternative fuel other than diesel or gasoline. In some embodiments, the engine 102 is powered using a gaseous fuel. It should be understood that, as used herein, the term "gaseous fuel" is intended to include fuels such as LPG, propane, natural gas, and other fuels, which may be stored under pressure, pumped, and injected in liquid form. In one embodiment, the engine 102 is powered using propane (e.g., LPG). In another embodiment, the engine 102 is powered using natural gas (e.g., CNG or LNG). However, in other embodiments, the engine 102 is similarly powered using other types of fuels.

In some embodiments, the engine 102 is originally designed to be powered using propane and/or natural gas. In other embodiments, however, the engine 102 is originally designed to be powered using diesel or gasoline, and is later converted to use propane and/or natural gas. In some embodiments, the engine 102 operates as a prime mover for a vehicle. In other embodiments, the engine 102 operates as a prime mover for an electric power generator.

The engine 102 includes an intake manifold 108 and an exhaust manifold 110. The intake manifold 108 is fluidly and operatively coupled to the intake air system 106. The intake manifold 108 is structured to transmit intake air received from the intake air system 106 to cylinders of the engine 102. The exhaust manifold 110 is structured to retrieve exhaust gas from the cylinders after the air/fuel mixture is combusted, and to transmit the exhaust gas to an exhaust system (not shown) for aftertreatment. In some embodiments, the engine 102 includes PCNs to cool the pistons, which operates to minimize or prevent combustion knock.

The turbocharger 104 includes a turbine 112 and a compressor 114, which are mounted on a common shaft (not shown). The turbine 112 is in exhaust gas receiving communication with the exhaust manifold 110. The exhaust gas received from the exhaust manifold 110 causes rotation of the turbine 112, which in turn causes rotation of the compressor 114. The compressor 114 receives filtered fresh intake air and compresses the intake air to increase its charge density. The compressor 114 provides the compressed intake air to the intake air system 106.

The intake air system 106 comprises an intake air circuit 116 defines a flow path for transmission of intake air from the compressor 114 to the intake manifold 108. It should be understood that the intake air circuit 116 comprises conduits (not shown) fluidly coupling each of the compressor 114, the various components of the intake air system 106, and the intake manifold 108.

The intake air system 106 includes a CAC 118, a CAC bypass line 120, a CAC bypass heater 122, a first control valve 124, a second control valve 126, a third control valve 128, a fourth control valve 130, and a controller 132. In such embodiments, at least one of the first, second, third, and fourth control valves 124, 126, 128, 130 comprises an active control valve that is structured to regulate flow in response to a control signal received from the controller 132. In some embodiments, at least one of the first, second, third, and fourth control valves 124, 126, 128, 130 comprises a passive control valve that is structured to regulate flow without the use of an electronic controller. For example, in some embodiments, at least one of the first, second, third, and fourth control valves 124, 126, 128, 130 comprises a press-balanced spring or on-off solenoid to control flow therethrough.

Each of the CAC 118, a CAC bypass line 120, and a CAC bypass heater 122 is positioned along the intake air circuit 116 in parallel with the others. The CAC 118 is structured to cool intake air flowing therethrough in order to increase charge density, thereby increasing power output of the engine and preventing knock.

The CAC bypass line 120 is a low-resistance passage that permits intake air to be transmitted through the intake air circuit 116 without being transmitted through the CAC 118.

The CAC bypass heater 122 is structured to heat the intake air flowing therethrough. According to various embodiments, the CAC bypass heater 122 comprises any of an electric grid heater, a gaseous fuel burner, and an engine coolant heat exchanger.

The first control valve 124 is positioned along the intake air circuit 116 upstream of the CAC. The first control valve 124 is structured to controllably divert the intake air around the CAC 118. The first control valve 124 is controllable between an open position, a closed position, and intermediate positions therebetween. When the first control valve 124 is in the open position, intake air is directed into the CAC 118. When the first control valve 124 is in the closed position, intake air is directed towards the CAC bypass line 120 and the CAC bypass heater 122, and the intake air is blocked from transmission to the CAC 118. Intermediate positions of the first control valve 124 permit a corresponding relative amount of the intake air to be transmitted to the CAC 118.

The second control valve 126 is positioned along the intake air circuit 116 upstream of each of the CAC bypass line 120 and the CAC bypass heater 122. The second control valve 126 operates in a similar manner as the first control valve 124 in that the second control valve 126 is controllable between an open position, a closed position, and intermediate positioned therebetween to controllably divert the intake air around at least one of the CAC bypass line 120 and the CAC bypass heater 122.

The third control valve 128 is positioned along the intake air circuit 116 downstream of the CAC. The third control valve 128 is controllably operable to selectively block intake air flow from the CAC 118 to the intake manifold 108.

The fourth control valve 130 is positioned along the intake air circuit 116 downstream of each of the CAC bypass line 120 and the CAC bypass heater 122. The fourth control valve 130 is controllably operable to selectively block intake air flow from the CAC bypass line 120 or the CAC bypass heater 122.

In some embodiments, the intake air system 106 includes all of the first, second, third, and fourth control valves 124, 126, 128, 130, as illustrated in FIG. 1. However, in some embodiments, the intake air system 106 includes the first and second control valves 124, 126 and does not include the third and fourth control valves 128, 130. In other embodiments, the intake air system 106 includes only the third and fourth control valves 128, 130 and does not include the first and second control valves 124, 126.

The controller 132 is communicatively and operatively coupled to each of the engine 102; the CAC bypass heater 122; the first, second, third, and fourth control valves 124, 126, 128, 130; and other components of the engine system 100. For example, in some embodiments, the engine system 100 also includes an intake manifold temperature sensor 134 operatively coupled to the intake manifold 108, and to which the controller 132 is communicatively and operatively coupled. As described further below in connection with FIG. 2, the controller 132 is structured to determine various operating conditions of the engine system 100, and to controllably direct intake air flow through a flow path comprising one or more of the CAC 118, the CAC bypass line 120, and the CAC bypass heater 122, based on the determined operating conditions, in order to minimize condensation in the intake air system 106. For example, in some embodiments, the determined operating conditions include engine load, ambient temperature, ambient humidity level, charge humidity level, dew point, and pressure.

For example, in some embodiments, intake air flow is controllably directed through a flow path comprising one or more of the CAC 118, the CAC bypass line 120, and the CAC bypass heater 122 based on an intake air pressure measured upstream of the CAC 118 (e.g., proximate the first control valve 124). For example, in one embodiment, the first control valve 124 is structured to divert flow around the CAC 118 when the intake air pressure is below a predetermined level. In some embodiments, at least one of the first, second, third, and fourth control valves 124, 126, 128, 130 is a mechanical (e.g., passive) control valve that is mechanically actuated rather controlled than based on a control signal received from the controller 132. For example, in one embodiment, the first control valve 124 is controlled based on intake air pressure, such that the first control valve 124 diverts flow around the CAC 118 when the intake air pressure is below a predetermined level. As the pressure increases, a spring force on the first control valve 124 is exceeded, causing intake air flow to start transitioning to the CAC 118. In some embodiments, the second control valve is mechanically actuated based on intake air temperature, such that the first control valve 124 diverts air through the CAC bypass heater 122 if the intake air is below a predetermined temperature.

Figure 2:
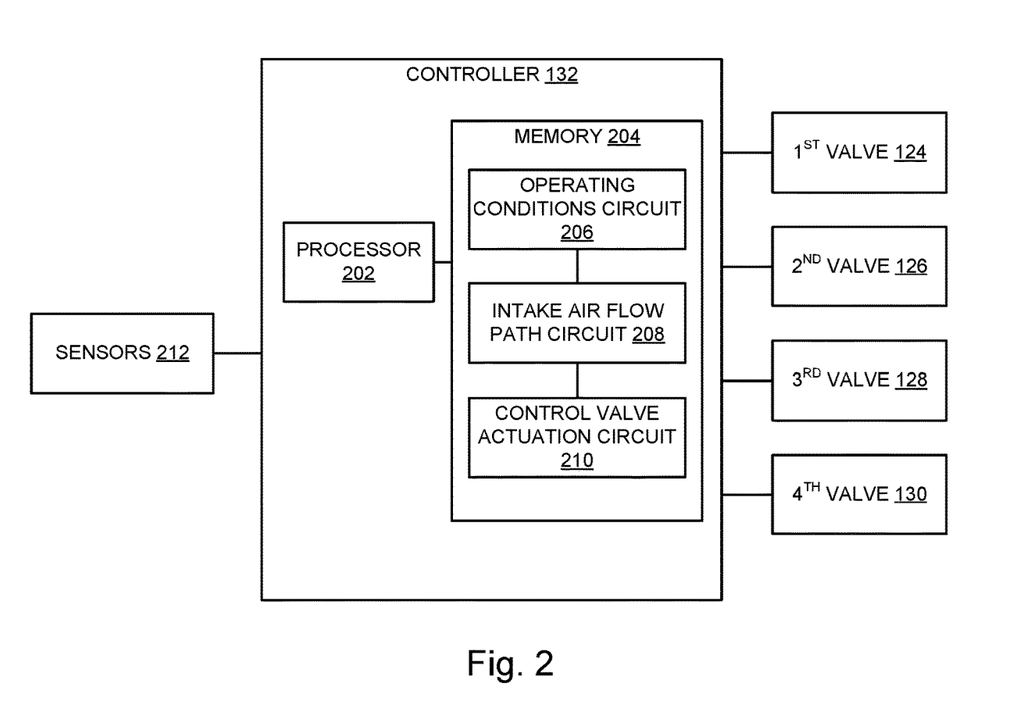
FIG. 2 is a block diagram of a controller of the engine system of FIG. 1.

FIG. 2 is a block diagram of the controller 132 of the engine system 100 of FIG. 1. The controller 132 includes a processor 202 and memory 204. The memory 204 is shown to include an operating conditions circuit 206, an intake air flow path circuit 208, and a control valve actuation circuit 210 communicably coupled to each other. In general, the controller 132 is structured to control operation of at least one of the first, second, third, and fourth control valves 124, 126, 128, 130 based on determined operating conditions of the engine system 100. While various circuits with particular functionality are shown in FIG. 2, it should be understood that the controller 132 may include any number of circuits for completing the functions described herein. For example, the activities of multiple circuits may be combined as a single circuit, additional circuits with additional functionality may be included, etc. Further, it should be understood that the controller 132 may further control other vehicle activity beyond the scope of the present disclosure.

Certain operations of the controller 132 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, receiving a value by which the interpreted parameter can be calculated, and/or by referencing a default value that is interpreted to be the parameter value.

The operating conditions circuit 206 is in operative communication with various sensors 212. For example, the sensors 212 may include the intake manifold temperature sensor 134 (FIG. 1), an ambient temperature sensor, an ambient humidity sensor, a CAC humidity sensor, a dew point sensor, a pressure sensor, various engine parameter (e.g., torque) sensors, and other types of sensors. The operating conditions circuit 206 is structured to receive measurement values from the sensors 212 and to interpret measurement values based on the received measurement values. The sensors 212 may include any of various types of sensors configured to measure characteristics related to the engine 102, the turbocharger 104, the intake air system 106, and/or related systems. The sensors may also include other temperature sensors (e.g., on the engine block, external to the engine 102, in any of the intake air passages, in an exhaust passage, or in any other location), humidity sensors, pressure sensors, an engine speed sensor, an engine torque sensor, a vehicle speed sensor, a position sensor, etc. Accordingly, the measurement values may include, but are not limited to, ambient temperature, engine load (e.g., torque), intake manifold temperature, other intake air temperatures, engine temperature, coolant temperature, exhaust temperature, turbocharger boost pressure, engine speed, vehicle speed, valve position, and/or any other engine or system characteristics.

Various operating condition values are described herein qualitatively. For example, ambient temperature is described as "cold," "warm," and "hot." However, it should be understood that in practice, these qualitative descriptors are defined by specific threshold values. These specific threshold values can vary based on several factors, such as engine displacement, power, application, etc. Table 1 below provides alternative definitions of the operating condition values described herein in terms of threshold values.

TABLE 1

Intake Air Flow Path Conditions

| Ambient Temperature | | |
|---|---|---|
| Cold | Cold/Warm | Warm/Hot |
| At or Below $1^{st}$ Temp Threshold Value | Between $1^{st}$ and $2^{nd}$ Temp Threshold Values | At or above $2^{nd}$ Temp Threshold Value |

| Engine Load | | |
|---|---|---|
| Light Load | Partial Load | Partial/Full Load |
| At or Below $1^{st}$ Torque Threshold Value | Between $1^{st}$ and $2^{nd}$ Torque Threshold Values | At or above $2^{nd}$ Torque Threshold Value |

| Flow Through Intake Air System Components (% of Total Mass Flow) | | |
|---|---|---|
| None | Partial | Majority |
| ≤5% | 1-99% | ≥50% |
| Substantially All | | All |
| ≥90% | | ≥95% |

The intake air flow path circuit 208 is structured to determine, based on the measurement signals received by the operating conditions circuit 206, a desired flow path of the intake air through at least one of the charge air cooler 118, the CAC bypass line 120, and the CAC bypass heater 122. As explained in further detail below, the intake air flow path can depend on various operating conditions, such as ambient temperature, engine load, and intake manifold temperature, among other factors. Depending on the particular operating conditions, the intake air flow path circuit 208 can determine the intake air flow path either statically or dynamically throughout operation within the operating conditions defining a particular intake air flow path.

The control valve actuation circuit 210 is in operative communication with the intake air flow path circuit 208, and with each of the first, second, third, and fourth control valves 124, 126, 128, 130 of the intake air system 106 of FIG. 1. The control valve actuation circuit 210 is structured to control operation of one or more of the first, second, third, and fourth control valves 124, 126, 128, 130 based on the desired flow path determined by the intake air flow path circuit 208.

At cold ambient temperatures and light engine load (e.g., idle) conditions, the intake air flow path circuit 208 is structured to define a first intake air flow path so as to direct substantially all of the intake air flow through the CAC bypass heater 122, and to prevent flow through each of the CAC 118 and the CAC bypass line 120. The first intake air flow path is maintained through the CAC bypass heater 122 for a period of time after a cold start of the engine 102. In one example implementation, the control valve actuation circuit 210 is structured to close each of the first and second control valves 124, 126 to control intake air flow through the first intake air flow path.

At cold ambient temperatures and partial load conditions, the intake air flow path circuit 208 is structured to define a second intake air flow path so as to direct intake air flow in part through the CAC bypass heater 122 and in part through the CAC bypass line 120, and to prevent flow through the CAC 118. Intake air temperature (e.g., intake manifold temperature) is measured and monitored (e.g., via the operating conditions circuit 206) during operation of the engine 102 under these conditions. In some implementations, the intake air flow path circuit 208 is structured dynamically determine the second intake air flow path to divide flow (e.g., define flow percentages) between each of the CAC bypass heater 122 and the CAC bypass line 120 so as to maintain the intake air temperature above a threshold value (e.g., its dew point). According to various embodiments, the second intake air flow path can include directing up to substantially all of the intake air flow through the CAC bypass heater 122. In one example implementation, the control valve actuation circuit 210 is structured to close the first control valve 124 and to controllably and dynamically actuate the second control valve 126 between partially closed and fully closed positions to control intake air flow through the second intake air flow path.

At cold to warm ambient temperatures and/or partial engine load conditions, the intake air flow path circuit 208 is structured to define a third intake air flow path to maintain air flow in part through the CAC bypass heater 122 and in part through the CAC bypass line 120, and to prevent flow through the CAC 118. The intake air flow path circuit 208 is structured to dynamically determine the third intake air flow path in a similar manner as with the second intake air flow path. According to various embodiments, the third intake air flow path can include directing up to substantially all of the intake air flow through the CAC bypass line 120 so as to minimize the air flow restrictions of the CAC bypass heater 122. In one example implementation, the control valve actuation circuit 210 is structured to close the first control valve 124 and to controllably and dynamically actuate the second control valve 126 between partially open and fully open positions to control intake air flow through the third intake air flow path.

At warm to hot ambient temperatures, and/or partial to full engine load conditions, the intake air flow path circuit 208 is structured to define a fourth intake air flow path so as to direct intake air flow at least partially through the CAC 118, and to block intake air flow through the CAC bypass heater 122. According to various embodiments, the fourth intake air flow path can include directing a majority and up to substantially all of the intake air flow through the CAC 118 so as to maximize charge air cooling. In one example implementation, the control valve actuation circuit 210 is structured to open the first control valve 124 and to close the second control valve 126 to control intake air flow through the fourth intake air flow path.

TABLE 2

Intake Air Flow Path Conditions

| Intake Air Flow Path | Ambient Temperature | Engine Load | Flow through CAC | Flow through CAC bypass line | Flow through CAC bypass heater |
|---|---|---|---|---|---|
| 1 | Cold | Light Load | None | None | All |
| 2 | Cold | Partial Load | None | Partial | Partial (Up to Substantially All) |
| 3 | Cold/Warm | Partial Load | None | Partial (Up to Substantially All) | None-Partial |

TABLE 2-continued

Intake Air Flow Path Conditions

| Intake Air Flow Path | Ambient Temperature | Engine Load | Flow through CAC | Flow through CAC bypass line | Flow through CAC bypass heater |
|---|---|---|---|---|---|
| 4 | Warm/Hot | Partial/Full Load | Majority to All | Partial to None | None |

Figure 3:
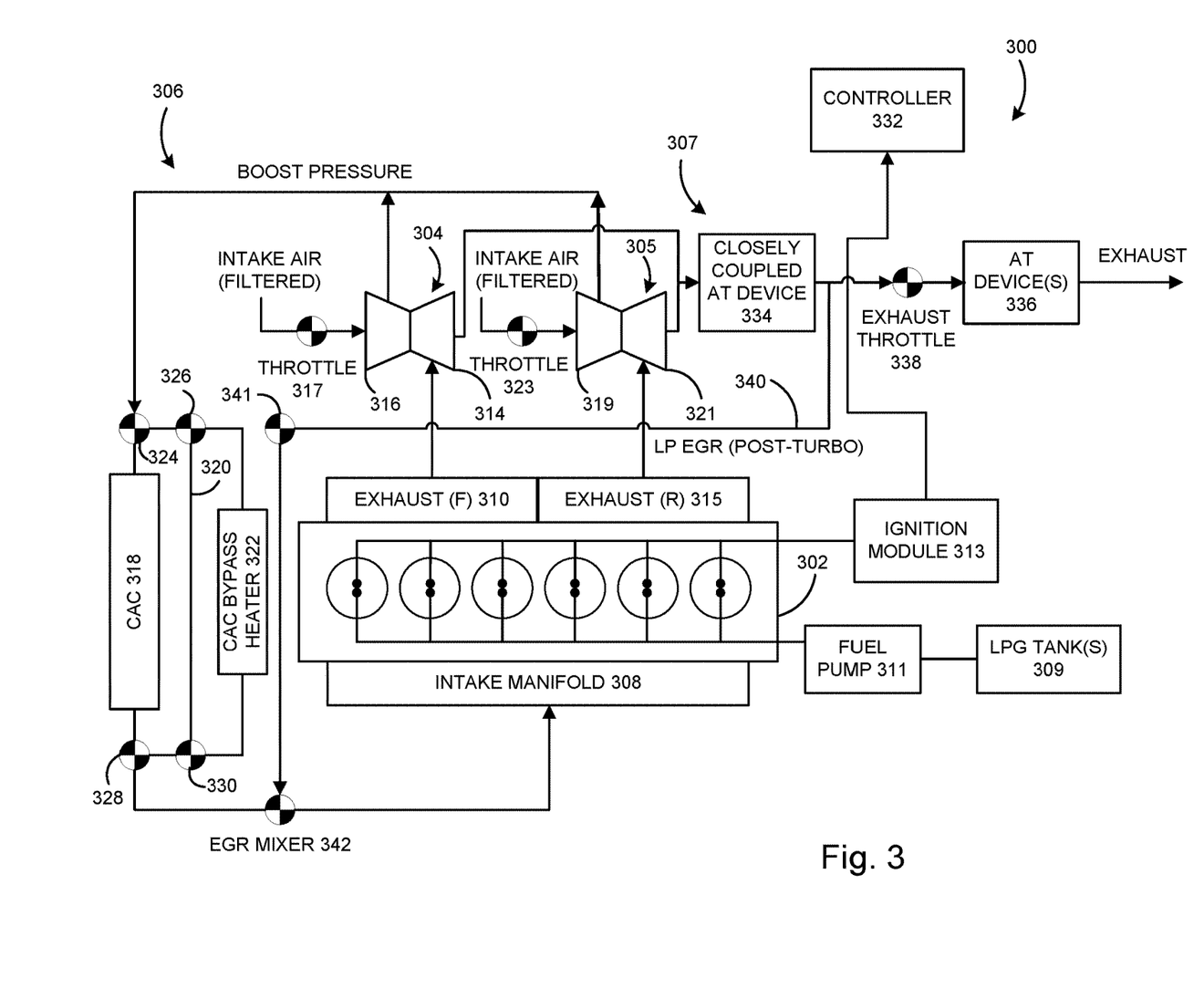
FIG. 3 is a block diagram of a high-efficiency SI LPG engine system, according to an example embodiment.

FIG. 3 is a block diagram of a high-efficiency SI LPG engine system 300, according to an example embodiment. Certain features of the engine system 300 of FIG. 3 are similar to those of the engine system 100 of FIG. 1. However, the engine system 300 includes various features in addition to those described in connection with the engine system 100 of FIG. 1.

The engine system 300 includes an engine 302, first and second turbochargers 304, 305, an intake air system 306, and an exhaust system 307. The engine 302 is structured to operate using LPG as its single and sole fuel source. The engine 302 receives LPG from one or more LPG tanks 309 fluidly coupled to the engine 302 via operation of a fuel pump 311. Other engines systems that utilize propane typically utilize propane in gaseous form, and/or utilize propane in conjunction with other fuels. In contrast, the engine 302 is specifically designed and optimized to operate using only LPG. In some embodiments, the engine 302 is structured to operate using a stoichiometric air/fuel ratio. However, in other embodiments, the engine 302 is structured to operate using a lean air/fuel ratio. In some implementations, the air/fuel ratio of the engine 302 is selected depending on the target market. In these implementations, the air/fuel ratio does not switch across the operating space. Combustion of the LPG is controlled via an ignition module 313 operatively coupled to a controller 332. According to various embodiments, the ignition module 313 is structured to operate any of various types of ignition systems, such as standard spark plugs with high-energy ignition ("HEI"), passive pre-chamber, fuel-fed pre-chamber, or laser ignition.

In some embodiments, the engine 302 includes a cooling system (not shown in FIG. 3) structured to facilitate evaporative cooling using the LPG fuel. In other words, the same fuel that is used to power the engine 302 is also used to provide evaporative cooling for the engine 302.

The engine 302 includes an intake manifold 308 and a front and rear exhaust manifolds 310, 315. The front and rear exhaust manifolds 310, 315 are parts of a split exhaust manifold. The intake manifold 308 is fluidly and operatively coupled to the intake air system 306. The intake manifold 308 is structured to transmit intake air received from the intake air system 306 to cylinders of the engine 302. The front and rear exhaust manifolds 310, 315 are structured to retrieve exhaust gas from the cylinders after the air/fuel mixture is combusted, and to transmit the exhaust gas to the exhaust system 307 for aftertreatment.

The first turbocharger 304 includes a first turbine 312 and a first compressor 314, which are mounted on a common shaft (not shown). The first turbine 312 is in exhaust gas receiving communication with the front exhaust manifold 310. The exhaust gas received from the front exhaust manifold 310 causes rotation of the first turbine 312, which in turn causes rotation of the first compressor 314. The first compressor 314 receives filtered fresh intake air upon actuation of a first inlet throttle 317, and compresses the intake air to increase its charge density. In some embodiments, the first inlet throttle 317 is positioned upstream of the first compressor 314. However, in other embodiments, the first inlet throttle 317 is positioned downstream of the first compressor 314. The first compressor 314 provides the compressed intake air to the intake air system 306.

The second turbocharger 305 similarly includes a second turbine 319 and a second compressor 321. The second turbine 319 is in exhaust gas receiving communication with the rear exhaust manifold 315. The second turbocharger 305 operates in a similar manner as the first turbocharger 304, and also provides compressed intake air to the intake air system 306. For example, the second compressor 321 receives filtered fresh intake air upon actuation of a second inlet throttle 323, and compresses the intake air to increase its charge density. In some embodiments, the second inlet throttle 323 is positioned downstream of the second compressor 321. However, in other embodiments, the second inlet throttle 323 is positioned downstream of the second compressor 321. Each of the first and second turbochargers 304, 305 include independently operable wastegates (not shown).

The intake air system 306 includes an intake air circuit 316, a CAC 318, a CAC bypass line 320, a CAC bypass heater 322, a first control valve 324, a second control valve 326, a third control valve 328, a fourth control valve 330, and the controller 332. The intake air system 306 operates in a generally similar manner to the intake air system 106 of FIG. 1. For example, the controller 332 is structured to determine various operating conditions of the engine system 300, and to controllably direct intake air flow through a flow path comprising one or more of the CAC 318, the CAC bypass line 320, and the CAC bypass heater 322, based on the determined operating conditions, in order to minimize condensation in the intake air system 306.

The exhaust system 307 includes first and second aftertreatment devices 334, 336 and an exhaust throttle 338. Exhaust gas is transmitted from the front and rear exhaust manifolds 310, 315 to the respective first and second turbines 312, 319, and through the first and second aftertreatment devices 334, 336. The first aftertreatment device 334 is a "closely coupled" aftertreatment device because it is positioned relatively close to the engine 302. The position of the first aftertreatment device 334 close to the engine 302 minimizes temperature losses of the exhaust gas before it reaches the first aftertreatment device 334. Each of the first and second aftertreatment devices 334, 336, according to various embodiments, include one or more of an oxidation catalyst, a three-way catalyst, a particulate filter, a selective catalytic reduction catalyst, a storage device, or any of various other types of aftertreatment devices.

The engine system 300 also includes an EGR system 340. The EGR system 340 is structured to transmit a portion of the exhaust gas from the engine 302 back to the intake manifold 308 of the engine 302. Operation of the EGR system 340 reduces nitrogen oxide ($NO_x$) emissions from the engine 302. In some embodiments, the EGR system 340 receives exhaust gas from the exhaust system 307 downstream of the first aftertreatment device 334 and upstream of the second aftertreatment device 336. In other embodiments, the EGR system 340 receives exhaust gas from the exhaust system 307 downstream of at least one of the first and second turbochargers 304, 305, and upstream of the first aftertreatment device 334. The amount of exhaust gas that is recirculated through the EGR system 340 is controlled via operation of the exhaust throttle 338. Flow through the EGR system 340 is also controlled via operation of an EGR valve 341. Some embodiments do not include at least one of the exhaust throttle 338 and the EGR valve 341. It should be understood that, according to various embodiments, the EGR system 340 may be controlled via active control elements, passive control elements, or a combination of active and passive control elements. The EGR system 340 illustrated in FIG. 3 is a low-pressure EGR system because it recirculates exhaust gas from downstream of the first and second turbochargers 304, 305. In some embodiments, the engine system 300 also includes a high-pressure EGR system, which circulates exhaust gas from upstream of the first and second turbochargers 304, 305. The exhaust gas recirculated through the EGR system 340 is mixed with the intake air via an EGR mixer 342, and subsequently transmitted to the intake manifold 308 of the engine 302.

Figure 4:
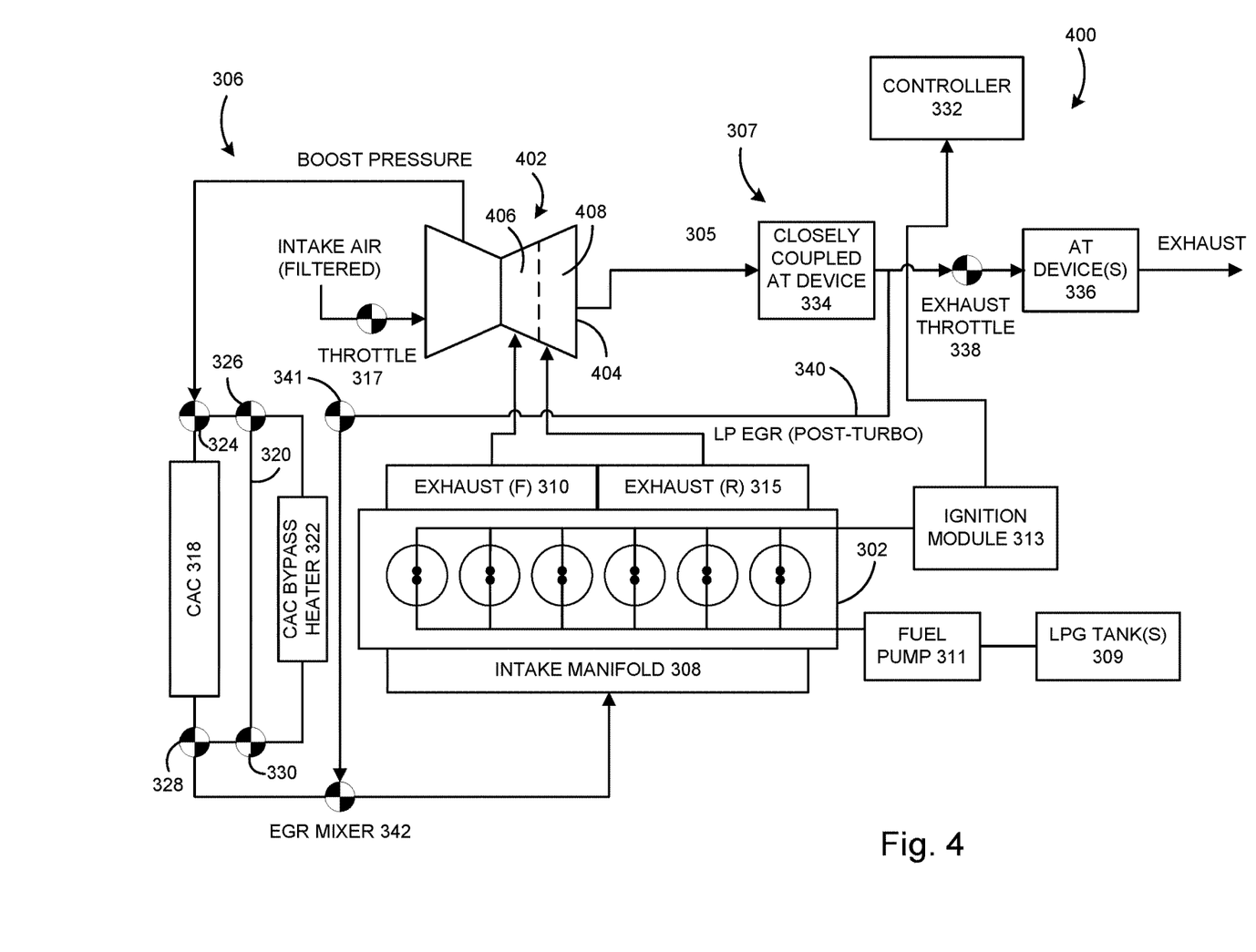
FIG. 4 is a block diagram of a high-efficiency SI LPG engine system including the engine of the engine system of FIG. 3, according to an alternative example embodiment.

FIG. 4 is a block diagram of a high-efficiency SI LPG engine system 400 including the engine 302 of FIG. 3, according to an alternative example embodiment. The engine system 400 of FIG. 4 is generally similar to the engine system 300 of FIG. 3. However, the engine system 400 of FIG. 4 includes a single wastegated turbocharger 402 with a turbine 404 comprising a divided turbine housing. In particular, the turbine 404 includes a first housing section 406 and a second housing section 408. The first housing section 406 is structured to receive exhaust gas from the front exhaust manifold 310, and the second housing section 408 is structured to receive exhaust gas from the rear exhaust manifold 315.

The divided turbine housing of the turbocharger 402 and the split exhaust manifold including the front and rear exhaust manifolds 310, 315 operate to minimize or prevent combustion knock. In particular, the divided housing of the turbocharger 402 prevents cross-talk (backpressure) between cylinders. The divided housing of the turbocharger 402 also eliminates pumping overlap (backpressure) between cylinders.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment," "an embodiment," "an example embodiment," or similar language means that a particular feature, structure, or characteristic described in connection with the embodiment is included in at least one embodiment of the present invention. Thus, appearances of the phrases "in one embodiment," "in an embodiment," "in an example embodiment," and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as the processor 202 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An intake air system, comprising:
   a charge air cooler defining in part an intake air circuit;
   a bypass line defining in part the intake air circuit in parallel flow with the charge air cooler;
   a bypass heater defining in part the intake air circuit in parallel flow with each of the charge air cooler and the bypass line;
   a first valve positioned along the intake air circuit upstream of the charge air cooler, the first valve structured to controllably divert the intake air around the charge air cooler; and
   a second valve positioned along the intake air circuit upstream of the bypass heater, the second valve structured to controllably divert the intake air around at least one of the bypass line and the bypass heater.

2. The intake air system of claim 1, wherein the first valve is a first control valve and the second valve is a second control valve, and further comprising:
   a controller operatively coupled to each of the engine, the first control valve, and the second control valve, the controller comprising:
      an operating conditions circuit structured to
         receive an engine load signal indicative of an engine load on the engine; and
         receive an ambient temperature signal indicative of a measured ambient temperature external to the engine;
      an intake air flow path circuit structured to determine, based on each of the engine load signal and the ambient temperature signal, a desired flow path of the intake air through at least one of the charge air cooler, the bypass line, and the bypass heater; and a control valve actuation circuit structured to control each of the first and second control valves to cause the intake air to flow along the determined desired flow path.

3. The intake air system of claim 2, wherein the intake air flow path circuit is structured to, in response to the engine load being less than a first engine load value and the ambient temperature is less than a first ambient temperature value, determine that the desired flow path of the intake air includes directing flow of the intake air through the bypass heater and diverting flow of the intake air around each of the charge air cooler and the bypass line.

4. The intake air system of claim 1, wherein the first valve is structured to controllably divert the intake air around the charge air cooler when a pressure of the intake air proximate the first valve is less than a first intake air pressure level.

5. The intake air system of claim 1, further comprising:
   a third valve positioned along the intake air circuit downstream of the charge air cooler; and
   a fourth valve positioned along the intake air circuit downstream of the bypass heater and the bypass line.

6. A method, comprising:
   providing an intake air system for an engine, the intake air system comprising:
      an intake air circuit structured to transmit intake air from a compressor to an intake manifold of the engine, a charge air cooler defining in part the intake air circuit, a first bypass line defining in part the intake air circuit in parallel with the charge air cooler, a second bypass line defining in part the intake air circuit in parallel with each of the charge air cooler and the first bypass line, the second bypass line including a bypass heater; and
   determining engine operating conditions; and
   selectively directing intake air flow through at least one of the charge air cooler, the first bypass line, and the second bypass line based on the determined engine operating conditions.

7. An engine system, comprising:
   a direct fuel injection system in communication with each of a plurality of cylinders of the engine system; and
   a turbocharger comprising a turbine in exhaust gas receiving communication with an exhaust manifold of the engine system, and a compressor in intake air providing communication with an intake manifold of the engine system;
   a charge air cooler defining in part an intake air circuit;
   a bypass line defining in part the intake air circuit in parallel with the charge air cooler;
   a bypass heater defining in part the intake air circuit in parallel with each of the charge air cooler and the bypass line; and
   wherein the engine system does not include an exhaust gas recirculation system in exhaust gas receiving communication with the exhaust manifold and in exhaust gas providing communication with the intake manifold.

8. The engine system of claim 7, further comprising an inlet throttle in communication with the turbocharger.

9. The engine system of claim 7, wherein the fuel injection system is configured to inject a diesel fuel.

10. The engine system of claim 7, wherein the turbocharger is a first turbocharger, the turbine is a first turbine, and the compressor is a first compressor, and wherein the engine system further comprises:
    a second turbocharger comprising a second turbine in exhaust gas receiving communication with the exhaust manifold, and a second compressor in intake air providing communication with the intake manifold.

11. The engine system of claim 10, wherein the exhaust manifold is a split exhaust manifold comprising:
    a front exhaust manifold portion in exhaust gas providing communication with the first turbine; and
    a rear exhaust manifold portion in exhaust gas providing communication with the second turbine.

12. The engine system of claim 7, wherein the charge air cooler is in intake air receiving communication with the compressor and in intake air providing communication with the intake manifold.

13. The engine system of claim 12, wherein the compressor is in intake air providing communication with the intake air circuit, the charge air cooler positioned along the intake air circuit, the intake air circuit further defining a bypass line in parallel with the charge air cooler.

14. The engine system of claim 7, further comprising an intake air flow control system structured to controllably a controller configured to direct intake air flow through a flow path comprising one or more of the charge air cooler, the bypass line, and the bypass heater in order to minimize condensation in the intake air circuit.

15. The engine system of claim 14, wherein the intake air flow control system comprises:
   a first valve positioned along the intake air circuit upstream of the charge air cooler, the first valve structured to controllably divert the intake air around the charge air cooler; and
   a second valve positioned along the intake air circuit upstream of the bypass heater, the second valve structured to controllably divert the intake air around at least one of the bypass line and the bypass heater.

16. An intake air system, comprising:
   a charge air cooler positioned along part an intake air circuit;
   a bypass line positioned along intake air circuit in parallel with the charge air cooler;
   a bypass heater positioned along the intake air circuit in parallel with each of the charge air cooler and the bypass line;
   a first valve positioned along the intake air circuit upstream of the charge air cooler, the first valve structured to controllably divert the intake air around the charge air cooler; and
   a second valve positioned along the intake air circuit upstream of the bypass heater, the second valve structured to controllably divert the intake air around at least one of the bypass line and the bypass heater;
   a third valve positioned along the intake air circuit downstream of the charge air cooler; and
   a fourth valve positioned along the intake air circuit downstream of the bypass heater and the bypass line.

* * * * *